United States Patent
Schoemann et al.

(10) Patent No.: US 7,871,119 B2
(45) Date of Patent: Jan. 18, 2011

(54) DOOR TRIM PANEL WITH DUAL DENSITY BOLSTER ARMREST AND INTEGRATED COMPONENTS

(75) Inventors: Michael P Schoemann, Waterford, MI (US); John D Youngs, Southgate, MI (US); Mark Heinze, Clarkston, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 1543 days.

(21) Appl. No.: 10/709,382

(22) Filed: Apr. 30, 2004

(65) Prior Publication Data

US 2005/0242619 A1    Nov. 3, 2005

(51) Int. Cl.
    *B60J 5/00*    (2006.01)
(52) U.S. Cl. .................................. 296/146.7
(58) Field of Classification Search ........... 296/146.7, 296/153, 1.09, 39.1, 146.6, 146.5, 152, 187.12; 49/502, 503; 264/46.5, 46.4, 46.6, 83; 248/118; 280/730.2; 428/36.5
    See application file for complete search history.

(56) References Cited

U.S. PATENT DOCUMENTS

| | | | |
|---|---|---|---|
| 3,400,979 A | 9/1968 | James et al. ................. 297/412 |
| 4,124,308 A | 11/1978 | Sokolow | |
| 4,456,644 A | 6/1984 | Janz et al. | |
| 4,470,936 A | 9/1984 | Potter | |
| 4,667,979 A | 5/1987 | Wolff | |
| 4,766,025 A | 8/1988 | Sanok et al. | |
| 4,780,345 A * | 10/1988 | Gray ......................... 428/36.5 |
| 4,781,956 A | 11/1988 | Zimmermann et al. ........ 428/43 |
| 4,783,114 A * | 11/1988 | Welch ........................ 296/153 |
| 4,810,452 A | 3/1989 | Taillefert et al. ............ 264/247 |
| 4,929,017 A | 5/1990 | Lilienthal et al. | |
| 4,952,358 A | 8/1990 | Okina et al. | |
| 5,040,335 A | 8/1991 | Grimes ........................ 49/502 |
| 5,071,605 A | 12/1991 | Kawaguchi et al. ........ 264/45.2 |
| 5,073,318 A * | 12/1991 | Rohrlach et al. ........... 264/46.5 |
| 5,178,807 A | 1/1993 | Thary ........................ 264/46.4 |
| 5,181,759 A * | 1/1993 | Doolittle ..................... 296/153 |
| 5,224,299 A | 7/1993 | Abe ............................. 49/502 |
| 5,297,842 A | 3/1994 | Hayashi | |
| 5,387,390 A | 2/1995 | Kornylo .................... 264/46.8 |

(Continued)

FOREIGN PATENT DOCUMENTS

DE        3711079        10/1988

(Continued)

OTHER PUBLICATIONS

Manfred Fritsch, *Integrated Soft Pads for One Step Molded Parts*, U.S. Publication No. 2002/0066972 A1; Publication Date: Jun. 6, 2002.

(Continued)

*Primary Examiner*—Kiran B. Patel
(74) *Attorney, Agent, or Firm*—Wood, Herron & Evans, L.L.P.

(57) ABSTRACT

A door trim panel including a cover stock, an armrest coupled to the cover stock and having a first density, an upper energy absorber disposed above the armrest and having a second density higher than the first density, and a lower energy absorber disposed below the armrest and having a third density higher than the first density.

11 Claims, 2 Drawing Sheets

U.S. PATENT DOCUMENTS

| | | | |
|---|---|---|---|
| 5,395,135 A | 3/1995 | Lim et al. | |
| 5,399,393 A | 3/1995 | Zoller | |
| 5,433,910 A | 7/1995 | Mukai et al. | |
| 5,445,430 A | 8/1995 | Nichols | 296/153 |
| 5,468,433 A | 11/1995 | Perry et al. | 264/46.4 |
| 5,474,841 A | 12/1995 | Matsuki et al. | 428/304.4 |
| 5,502,942 A | 4/1996 | Gras et al. | |
| 5,527,084 A | 6/1996 | Scherf | |
| 5,536,351 A | 7/1996 | Rheinlander et al. | 156/212 |
| 5,571,581 A | 11/1996 | Koizumi et al. | |
| 5,571,597 A | 11/1996 | Gallagher et al. | 428/152 |
| 5,573,617 A | 11/1996 | Franck et al. | 156/196 |
| 5,590,901 A | 1/1997 | MacGregor | 280/728.3 |
| 5,626,382 A | 5/1997 | Johnson et al. | 296/146.7 |
| 5,651,998 A | 7/1997 | Bertschi et al. | |
| 5,663,210 A | 9/1997 | Sugimoto et al. | 521/81 |
| 5,679,296 A | 10/1997 | Kelman et al. | |
| 5,692,711 A | 12/1997 | Tucker | 248/118 |
| 5,695,870 A * | 12/1997 | Kelch et al. | 428/319.7 |
| 5,709,912 A | 1/1998 | Goto et al. | |
| 5,709,925 A | 1/1998 | Spengler et al. | 428/198 |
| 5,715,966 A | 2/1998 | Nagano et al. | 220/339 |
| 5,738,810 A | 4/1998 | De Filippo | 264/46.7 |
| 5,744,077 A | 4/1998 | Grisch et al. | |
| 5,783,293 A | 7/1998 | Lammi | |
| 5,786,047 A | 7/1998 | Tomblin | |
| 5,792,413 A | 8/1998 | Ang et al. | 264/515 |
| 5,799,385 A | 9/1998 | Vecchiarino et al. | 29/469 |
| 5,803,415 A * | 9/1998 | Konishi et al. | 248/118 |
| 5,810,388 A | 9/1998 | Berardi et al. | 280/728.3 |
| 5,816,609 A | 10/1998 | Gray et al. | 280/728.3 |
| 5,837,172 A * | 11/1998 | Pritchard et al. | 264/46.4 |
| 5,868,455 A | 2/1999 | Springer et al. | |
| 5,951,094 A * | 9/1999 | Konishi et al. | 296/153 |
| 5,952,630 A | 9/1999 | Filion et al. | 200/5 |
| 5,976,289 A | 11/1999 | Kawakubo et al. | 156/78 |
| 5,995,380 A | 11/1999 | Maue et al. | 361/826 |
| 6,003,716 A | 12/1999 | Allison et al. | 220/326 |
| 6,012,735 A | 1/2000 | Gray et al. | 280/728.2 |
| 6,013,210 A | 1/2000 | Gardner, Jr. | 264/40.1 |
| 6,017,617 A | 1/2000 | Gardner, Jr. | 428/309.9 |
| 6,070,905 A | 6/2000 | Renault | |
| 6,092,858 A | 7/2000 | Bolwell | |
| 6,136,415 A | 10/2000 | Spengler | |
| 6,149,853 A | 11/2000 | Luckett et al. | 264/266 |
| 6,168,188 B1 | 1/2001 | Preisler et al. | 280/728.3 |
| 6,186,582 B1 | 2/2001 | Beckmann | |
| 6,210,613 B1 | 4/2001 | Stein et al. | 264/45.4 |
| 6,214,157 B1 | 4/2001 | Sjpengler | 156/304.6 |
| 6,217,098 B1 | 4/2001 | O'Brien et al. | 296/70 |
| 6,238,507 B1 | 5/2001 | Jones et al. | 156/224 |
| 6,248,200 B1 | 6/2001 | Dailey et al. | 156/245 |
| 6,251,326 B1 | 6/2001 | Siano et al. | 264/328.8 |
| 6,308,488 B1 | 10/2001 | Hoshino | |
| 6,319,438 B1 | 11/2001 | Smith et al. | 264/75 |
| 6,322,738 B1 | 11/2001 | Sicilia et al. | |
| 6,325,410 B1 * | 12/2001 | Eyrainer | 280/730.2 |
| 6,358,599 B1 * | 3/2002 | Deibel et al. | 428/319.7 |
| 6,364,351 B1 | 4/2002 | Hier et al. | 280/732 |
| 6,368,093 B1 | 4/2002 | Vecchiarino et al. | 425/130 |
| 6,391,232 B1 * | 5/2002 | Fritsch | 264/46.6 |
| 6,409,947 B1 | 6/2002 | Wandyez | |
| 6,433,728 B1 | 8/2002 | Krupp et al. | 341/176 |
| 6,440,514 B1 | 8/2002 | Ueno et al. | |
| 6,447,047 B1 * | 9/2002 | Marcovecchio et al. | 296/146.7 |
| 6,453,535 B1 | 9/2002 | Nicholas | |
| 6,474,724 B2 | 11/2002 | Lemmon et al. | 296/189 |
| 6,544,449 B1 | 4/2003 | Gardner | 264/46.5 |
| 6,568,707 B2 | 5/2003 | Hier et al. | 280/732 |
| 6,572,300 B2 | 6/2003 | Altonen et al. | |
| 6,627,134 B2 | 9/2003 | Thomson | |
| 6,652,793 B2 | 11/2003 | Corrion et al. | 264/242 |
| 6,688,640 B1 | 2/2004 | Davis, Jr. et al. | 280/728.3 |
| 6,708,462 B2 | 3/2004 | Pokorzynski et al. | |
| 6,740,390 B2 | 5/2004 | Randazzo | 428/122 |
| 6,742,830 B2 | 6/2004 | Zimmerman et al. | |
| 6,756,004 B2 | 6/2004 | Davis, Jr. et al. | 264/255 |
| 6,758,510 B1 | 7/2004 | Starling | 296/39.1 |
| 6,761,388 B2 | 7/2004 | Lein et al. | 296/24.34 |
| 6,764,621 B2 | 7/2004 | Schwaighofer | |
| 6,764,633 B2 | 7/2004 | Takahashi et al. | 264/259 |
| 6,793,181 B1 | 9/2004 | Hallock | |
| 6,821,465 B1 * | 11/2004 | Stein et al. | 264/83 |
| 6,837,544 B2 | 1/2005 | Bornchen et al. | |
| 6,872,673 B2 * | 3/2005 | MacAulay | 428/319.7 |
| 6,875,484 B1 | 4/2005 | Kogure et al. | |
| 6,893,077 B1 | 5/2005 | DeJongh | |
| 6,899,363 B2 | 5/2005 | Dry | |
| 6,899,373 B2 | 5/2005 | Kim | |
| 6,921,571 B2 | 7/2005 | Funakoshi | |
| 6,929,309 B1 | 8/2005 | Radu et al. | |
| 6,955,392 B2 | 10/2005 | Dry | |
| 6,981,735 B1 | 1/2006 | Stephens | |
| 6,983,967 B2 | 1/2006 | Scheidmantal et al. | |
| 6,991,841 B2 | 1/2006 | Cowelchuk et al. | |
| 7,005,092 B2 | 2/2006 | Dooley et al. | |
| 7,108,312 B2 | 9/2006 | Cowelchuk et al. | |
| 7,156,437 B2 | 1/2007 | Cowelchuk et al. | |
| 2001/0030436 A1 | 10/2001 | Kifer et al. | 296/24.1 |
| 2001/0047899 A1 | 12/2001 | Ikeda | 180/90 |
| 2002/0041912 A1 | 4/2002 | Thomson | |
| 2002/0043861 A1 | 4/2002 | Meadows | 297/411.21 |
| 2002/0079603 A1 | 6/2002 | Bemis et al. | |
| 2002/0125734 A1 | 9/2002 | Pokorzynski et al. | 296/146.7 |
| 2002/0153741 A1 | 10/2002 | Speelman et al. | 296/70 |
| 2003/0041955 A1 * | 3/2003 | Spengler | 156/221 |
| 2003/0075833 A1 | 4/2003 | Thomson | |
| 2003/0155787 A1 | 8/2003 | Lein et al. | 296/24.1 |
| 2003/0184064 A1 | 10/2003 | Hier et al. | 280/732 |
| 2003/0184108 A1 | 10/2003 | Donovan et al. | 296/24.1 |
| 2003/0209888 A1 | 11/2003 | Davis, Jr. et al. | 280/728.3 |
| 2003/0209892 A1 | 11/2003 | Hier et al. | 280/732 |
| 2004/0017023 A1 | 1/2004 | Schoemann et al. | 264/245 |
| 2004/0032055 A1 | 2/2004 | Cavallaro et al. | |
| 2004/0119267 A1 | 6/2004 | Cowelchuck et al. | 280/728.3 |
| 2004/0119268 A1 | 6/2004 | Davis, Jr. et al. | 280/728.3 |
| 2004/0130051 A1 | 7/2004 | Cowelchok et al. | 264/46.4 |
| 2005/0023861 A1 * | 2/2005 | Hirotani et al. | 296/153 |
| 2005/0046075 A1 | 3/2005 | Youngs et al. | |
| 2005/0079336 A1 | 4/2005 | Dry et al. | |
| 2005/0186388 A1 | 8/2005 | Mekas et al. | |
| 2005/0194806 A1 | 9/2005 | Cowelchuk et al. | |
| 2005/0200161 A1 | 9/2005 | Reed et al. | |
| 2005/0258569 A1 | 11/2005 | Schoemann et al. | |
| 2005/0258666 A1 | 11/2005 | Reed | |
| 2006/0082190 A1 | 4/2006 | Cowelchuk et al. | |
| 2006/0216479 A1 | 9/2006 | Cowelchuk et al. | |

FOREIGN PATENT DOCUMENTS

| | | |
|---|---|---|
| DE | 19534982 | 3/1996 |
| DE | 4480340 | 12/1996 |
| DE | 19733667 | 2/1999 |
| DE | 10 2004 023 823 | 12/2004 |
| DE | 601 06 159 | 9/2005 |
| EP | 1182024 | 2/2002 |
| EP | 1580077 | 9/2005 |
| FR | 2796610 | 1/2001 |
| JP | 62170303 | 7/1987 |
| JP | 6382847 | 4/1988 |
| JP | 8011145 | 1/1996 |
| JP | 8183059 | 7/1996 |
| JP | 08183059 | 7/1996 |
| JP | 2000 264361 * | 9/2000 |

| | | |
|---|---|---|
| JP | 2000264361 | 9/2000 |
| JP | 2003103676 | 4/2003 |
| JP | 2003266464 | 9/2003 |

OTHER PUBLICATIONS

Steven R. Sopher, *Advancements in Soft Polyolefin Bead Foams for Automotive Interior Trim Components*, Brochure. 2004, 10 pgs.

*Combined Search and Examination Report Under Sections 17 and 18*(3), The UK Patent Office.

Cowelchok et al., *Integrated Trim Plate With A Thermoplastic Cover*, U.S. Patent Application Publication No. 2004/0130051.

DePue, *Two-Shot Co-Injected Automotive Interior Trim Assembly And Method*, U.S. Patent Application Publication No. 2005/0183897.

Office Action issued in a related U.S. Appl. No. 10/708,312; dated as mailed on Sep. 18, 2006; 12 pages; U.S. Patent and Trademark Office.

Office Action issued in a related U.S. Appl. No. 10/708,315; dated as mailed on Oct. 5, 2006; 11 pages; U.S. Patent and Tradmark Office.

Office Action dated as mailed on May 17, 2006 for U.S. Appl. No. 10/708,312, 39 pages, USPTO.

Office Action issued in related U.S. Appl. No. 10/904,010; dated as mailed on Jul. 27, 2006; 12 pages; U.S. Patent and Trademark Office.

Office Action issued in related U.S. Appl. No. 10/904,008; dated as mailed on Oct. 31, 2006; 8 pages; USPTO.

Dipl.—Ing. Ropling; Office Action issued in related German patent application No. 10 2005 052 976.3-21; Apr. 28, 2008; 4 pages; German Patent and Trademark Office.

Final Office Action issued in related U.S. Appl. No. 10/904,008; dated as mailed on Apr. 9, 2007; 7 pages; USPTO.

Final Office Action issued in related U.S. Appl. No. 10/904,010; dated as mailed on May 3, 2007; 17 pages; USPTO.

Office Action issued in related U.S. Appl. No. 10/904,010; dated as mailed on Dec. 28, 2006; 14 pages; USPTO.

Office Action issued in related U.S. Appl. No. 11/160,088; dated as mailed on Jan. 23, 2007; 25 pages; USPTO.

Dipl.-ing. Rothe; German Office Action issued in a corresponding German application for related U.S. Appl. No. 11/160,088; May 30, 2006; 5 pages; German Patent and Trademark Office.

Dipl.-Ing. Röpling; Office Action issued in related German patent application No. 10 2005 050 162.1-21; dated Feb. 1, 2008; 5 pages; German Patent & Trademark Office.

Dipl.-Ing. Röpling; Office Action issued in related German patent application No. 10 2005 049 866.3-21; dated Jan. 28, 2008; 4 pages; German Patent & Trademark Office.

Office Action issued in related U.S. Appl. No. 10/708,315; dated as mailed on Mar. 22, 2007; 16 pages; USPTO.

Office Action issued in related U.S. Appl. No. 10/708,312; dated as mailed on Mar. 23, 2007; 10 pages; USPTO.

Office Action issued in related U.S. Appl. No. 10/904,008; dated as mailed on Mar. 17, 2008; 13 pages; USPTO.

Final Office Action issued in related U.S. Appl. No. 10/904,010; dated as mailed on May 7, 2008; 10 pages; USPTO.

Office Action issued in related U.S. Appl. No. 10/904,008; dated as mailed on Sep. 10, 2007; 8 pages; USPTO.

* cited by examiner

DOOR TRIM PANEL WITH DUAL DENSITY BOLSTER ARMREST AND INTEGRATED COMPONENTS

CROSS-REFERENCE

The present invention is related to U.S. Ser. No. 10/708,312, filed Feb. 24, 2004, U.S. Ser. No. 10/708,315, filed Feb. 24, 2004, U.S. Ser. No. 10/708,500, filed Mar. 8, 2004, U.S. Ser. No. 10/710,305, filed Jul. 1, 2004, U.S. Ser. No. 10/904,008, filed Oct. 19, 2004, U.S. Ser. No. 10/904,010, filed Oct. 19, 2004 and U.S. Ser. No. 10/904,409, filed Nov. 9, 2004.

FIELD OF THE INVENTION

The present invention relates generally to treatments for inner door panels for vehicles and, more particularly, to integrating various components into a door trim panel.

BACKGROUND OF THE INVENTION

The interior appearance of an automobile is but one consideration when purchasing a vehicle. Interiors are often given treatments that provide an increase in perceived value while allowing a person to differentiate one manufacturer from another. Efforts to reduce costs by removing even the most seemingly insignificant interior details have been met with adverse reactions from consumers.

Current interiors trend towards fluid, wrap-around styling. Hard angular metal and plastic surfaces have been replaced by softer, rounded, padded or cushioned surfaces covered by various textiles. The inner panel of a vehicle door, or the side towards the passenger compartment, is one area that typically receives treatment.

Generally, a vehicle door is constructed by welding inner and out panels together to form the door. A cavity defined by the inner and outer panels houses a window track for raising and lowering a window and a latch mechanism for opening and closing the door. A motor and a window regulator may also be housed when a vehicle is equipped with power windows. Similarly, a lock and a solenoid may also be housed when a vehicle is equipped with power door locks. Likewise, a side impact bar may be housed.

A treatment is placed over the inner panel of the door to provide a finished appearance, hiding the track, latch mechanism, motor, window regulator, lock, solenoid, side impact bar, etc. The treatment of an inner door panel typically includes a plurality of separate components with each component having a separate function. The components often include a door trim panel, sound absorber, water barrier, armrest, map pocket closeout, side impact blocks, etc. Switches mounted in a switch bezel for controlling the operation of the motor and solenoid may also be attached to the door trim panel. A map pocket may also be attached to the door trim panel.

The components are typically assembled together and attached to an inner door panel by several different conventional processes including adhesives, heat staking, sonic welding, fasteners, etc. While such conventional processes may provide a desired appearance and functionality, the use of such conventional processes introduce their own drawbacks. For instance, the use of multiple components increases costs. Further, the components require assembly adding numerous steps to the assembly process. Moreover, the use of multiple components results in a comparatively heavy door trim panel, thereby increasing the weight of a vehicle.

Therefore, there exists a need in the art for a door trim panel that integrates various components without significantly increased cost or complicated assembly and with reduced weight.

SUMMARY OF INVENTION

The present invention provides a door trim panel including a dual density bolster armrest and integrated components. To this end, and in accordance with principles of the present invention, a door trim panel includes a cover stock, an armrest coupled to the cover stock and having a first density, an upper energy absorber that also acts as the door bolster disposed above the armrest and having a second density higher than the first density, and a lower energy absorber disposed below the bolster and having a third density higher than the first density.

In a preferred embodiment, a cover stock is shaped to form a cavity. A first portion of the cavity associated with an armrest is filled with foam, such as expanded polypropylene beads, to a first density while second and third portions of the cavity associated with upper and lower energy absorbers are filled, preferably with the same beaded foam material, to second and third densities. The second and third densities are both higher than the first density.

By virtue of the forgoing, there is thus provided a door trim panel that integrates various components without significantly increased cost or complicated assembly and with reduced weight.

Various additional objectives, advantages, and features of the present invention will become more readily apparent to those of ordinary skill in the art from the accompanying drawings and description thereof.

DETAILED DESCRIPTION

Figure 1:
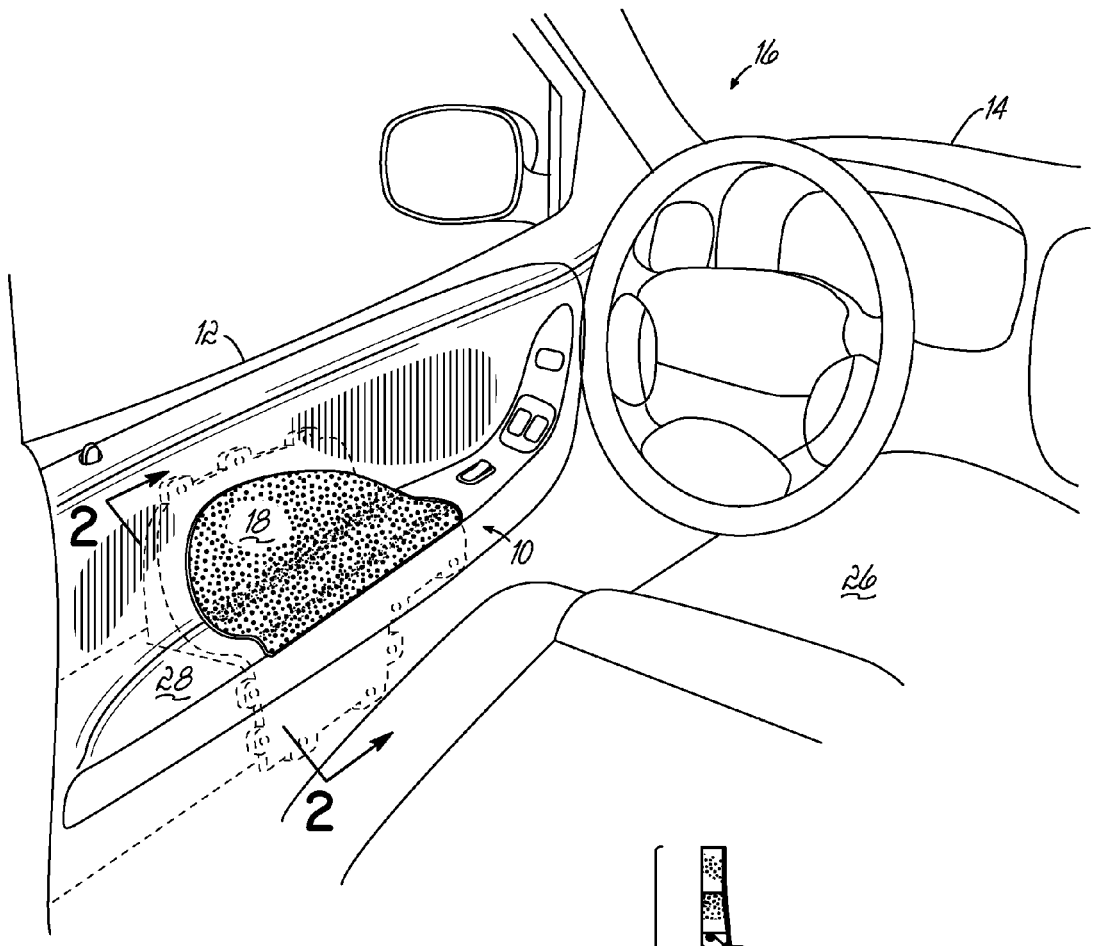
FIG. 1 is a perspective view of door trim panel fastened to a vehicle door and constructed in accordance with principles of the present invention.

Referring first to FIG. 1, a door trim panel 10 constructed in accordance with a preferred embodiment of the invention is shown fastened to a vehicle door. A vehicle may be, for example, an automobile, a truck, or an aircraft. More specifically, door trim panel 10 is shown fastened to the inner steel sheet metal of a door 12 of a body 14 of an automobile 16. However, those of ordinary skill in the art will appreciated that a door trim panel 10 may be used on other doors such as, for example, sliding doors, hatches, etc. Further, those of ordinary skill in the art will also appreciate that door 12 may be constructed of other materials such as, for example, aluminum or a composite, such as fiberglass or carbon fiber.

Figure 2:
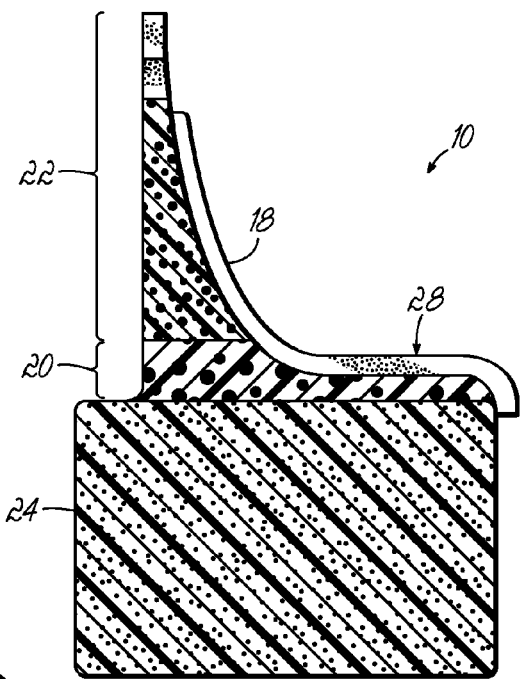
FIG. 2 is a cross-sectional view of the door trim panel of FIG. 1 taken along line 2-2 of FIG. 1.

Referring also to FIG. 2, a cross-sectional view of door trim panel 10 is shown. Generally, door trim panel 10 comprises a cover stock 18, an armrest 20 coupled to cover stock 18 and having a first density, and an upper energy absorber 22, which also acts as a door bolster in the preferred embodiment, disposed above armrest 20 and having a second density higher than the first density. A lower energy absorber 24 is disposed below armrest 20 and has a third density higher than the first density. Preferably, cover stock 18 extends over both armrest 20 and upper energy absorber or door bolster 22.

More specifically, and in a preferred embodiment, cover stock 18 is formed or shaped from a textile or a cloth, a vinyl or polyvinyl chloride (PVC), or a thermoplastic olefin (TPO), each having a polypropylene foam backing. Cover stock 18 creates a decorative, textured, outer surface for passengers occupying passenger compartment 26 of automobile 16. In other embodiments of the invention, cover stock 18 may be shaped from other suitable materials.

Further, armrest 20 may be molded of foam and coupled to cover stock 18 to provide a soft, cushioned, compressible feel to an armrest 28. In a preferred embodiment, armrest 20 may be molded from expanded polypropylene beads to densities ranging between approximately 30 and 45 grams per liter (g/l), and more preferably between approximately 35 and 42 g/l. In other embodiments of the invention, armrest 20 may be molded from other suitable materials.

In a preferred embodiment, upper energy absorber 22 and lower energy absorber 24 may also be molded of foam, such as from expanded polypropylene beads. In other embodiments of the invention, upper energy absorber 22 and lower energy absorber 24 may be molded from other suitable materials. Molding upper energy absorber 22 and lower energy absorber 24 to second and third densities, respectively, allows for separate and distinct energy absorbers for passengers occupying the passenger compartment 26 in the event of a side impact.

For example, it is known that the center of mass for a male passenger seated in the passenger compartment of an automobile is generally located on the passenger's torso at approximately chest level, while the center mass for a female passenger is located at approximately hip level. Thus, the second density for upper energy absorber 22 may be optimized for male passengers, while the third density for lower energy absorber 24 may be optimized for female passengers.

In a preferred embodiment, upper energy absorber 22 and lower energy absorber 24 may be molded from expanded polypropylene beads or other expanded polyolefin bead foams using a steam chest process to densities ranging between approximately 35 and 60 g/l. More preferably, upper energy absorber 22 is molded to densities ranging between approximately 45 and 55 g/l while lower energy absorber 24 may be molded to densities ranging between approximately 40 and 50 g/l. Thus, the preferred embodiment optimizes upper energy absorber 22 and lower energy absorber 24 for male and female passengers, respectively.

In accordance with another embodiment of the present invention, the second density for upper energy absorber 22 and the third density for lower energy absorber 24 may be substantially equal. Such an embodiment provides a similar energy absorber for male and female passengers in a side impact collision.

To mold door trim panel 10 from expandable polypropylene beads a conventional steam chest molding process may be used. In such a process, cover stock 18 may be shaped to form a cavity. A first portion of the cavity associated with armrest 20 may then be filled with foam, e.g., expandable polypropylene beads, in a first density. Next, a second portion of the cavity associated with upper energy absorber 22 may be filled with foam in a second density higher than the first density. A third portion of the cavity associated with lower energy absorber 24 may then be filled with foam in a third density higher than the first density.

Figure 3:
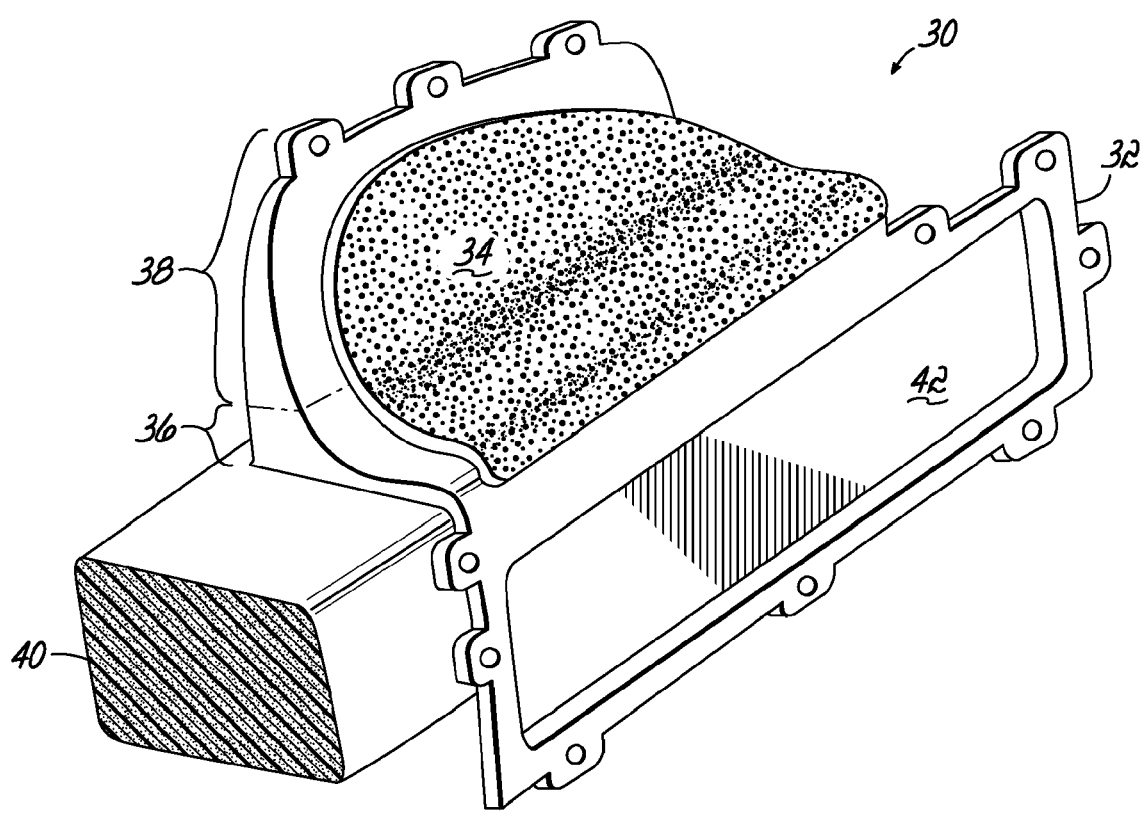
FIG. 3 is an enlarged perspective view, partially cut away, of an alternative door trim panel including a map pocket closeout.

Turning now to FIG. 3, an enlarged perspective view, partially cut away, of an alternative door trim panel 30 is shown. Similar to door trim panel 10 shown in FIGS. 1 and 2, door trim panel 30 includes a cover stock 34 and an armrest 36 coupled to cover stock 34 at a lower portion of cover stock 34. Armrest 36 has a first density in accordance with the invention, and preferably as described above. An upper energy absorber 38, which also preferably serves as a door bolster, is disposed above armrest 36 and has a second density higher than the first density in accordance with the invention preferably as described above. A lower energy absorber 40 is disposed below armrest 36 and has a third density higher than the first density, preferably as described above. As shown, cover stock 34 preferably extends over both armrest 36 and upper energy absorber 38.

More specifically, door trim panel 30 includes a map pocket closeout 32. Map pocket closeout 32 may be formed in lower energy absorber 40. For example, placing a cover stock 42 in the molding process may form map pocket closeout 32. Similar to cover stock 18 in FIGS. 1 and 2, cover stock 42 may be a textile or a cloth, a vinyl or polyvinyl chloride (PVC), or a thermoplastic olefin (TPO). In other embodiments of the invention, cover stock 42 may be shaped from other suitable materials. In still other embodiments of the present invention, a cover stock 42 may not be used.

While the present invention has been illustrated by a description of a preferred embodiment and while this embodiment has been described in some detail, it is not the intention of the Applicants to restrict or in any way limit the scope of the appended claims to such detail. Additional advantages and modifications other than those specifically mentioned herein will readily appear to those skilled in the art. This has been a description of the present invention, along with the preferred methods of practicing the present invention as currently known. However, the invention itself should only be defined by the appended claims, wherein we claim:

The invention claimed is:

1. A door trim panel, comprising:
   a cover stock;
   an armrest coupled to the cover stock and having a first density;
   an upper energy absorber disposed above the armrest and having a second density higher than the first density; and
   a lower energy absorber disposed below the armrest and having a third density higher than the first density,
   wherein the armrest, upper energy absorber and lower energy absorber are formed from a polyolefin bead foam.

2. The door trim panel of claim 1, wherein the second and third densities are substantially equal.

3. The door trim panel of claim 1, wherein the cover stock is at least one of a textile, a polyvinyl chloride (PVC), and a thermoplastic olefin (TPO), each with a polypropylene foam backing.

4. A vehicle, comprising:
   a body including a door; and
   a door trim panel, the door trim panel including a cover stock, an armrest coupled to the cover stock and having a first density, an upper energy absorber disposed above the armrest and having a second density higher than the first density, and a lower energy absorber disposed below the armrest and having a third density higher than the first density,
   wherein the armrest, upper energy absorber and lower energy absorber are formed from a polyolefin bead foam.

5. The vehicle of claim 4, wherein the second and third densities are substantially equal.

6. The vehicle of claim 4, wherein the cover stock is at least one of a textile, a polyvinyl chloride (PVC), and a thermoplastic olefin (TPO), each with a polypropylene foam backing.

7. A door trim panel, comprising:
a cover stock;
an armrest coupled to the cover stock and having a first density;
an upper energy absorber disposed above the armrest and having a second density higher than the first density; and
a lower energy absorber disposed below the armrest and having a third density higher than the first density and less than the second density,
wherein the armrest, upper energy absorber and lower energy absorber are formed from a polyolefin bead foam.

8. The door trim panel of claim 7, wherein the cover stock is at least one of a textile, a polyvinyl chloride (PVC), and a thermoplastic olefin (TPO), each with a polypropylene foam backing.

9. The door trim panel of claim 7, wherein the second density is between approximately 45 and 55 g/l and the third density is between approximately 40 and 50 g/l.

10. The vehicle of claim 4, wherein the third density is less than the second density.

11. The vehicle of claim 10, wherein the second density is between approximately 45 and 55 g/l and the third density is between approximately 40 and 50 g/l.

\* \* \* \* \*